Patented Feb. 20, 1923.

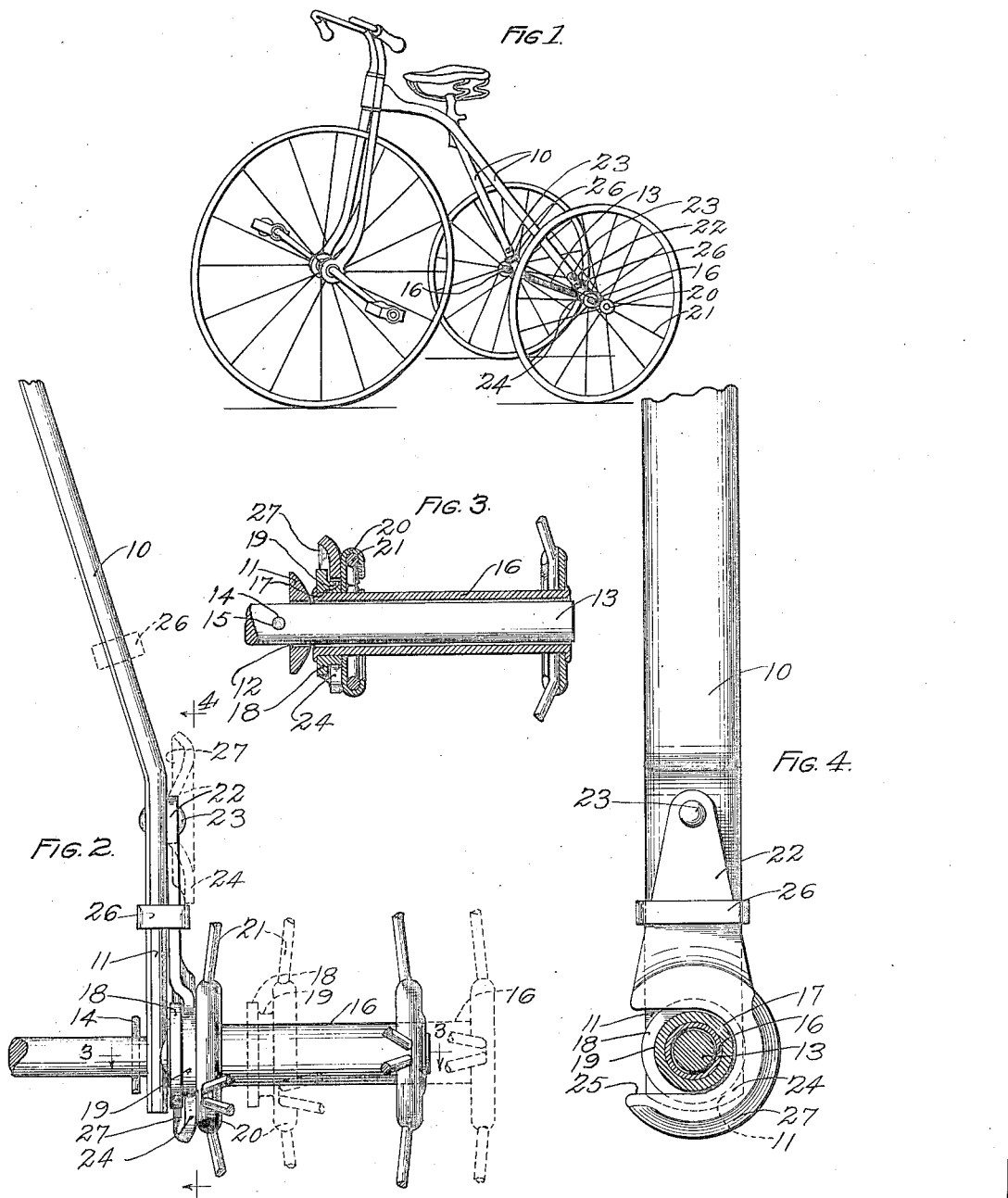

1,446,243

UNITED STATES PATENT OFFICE.

REINHARDT H. BROWN, OF LAPORTE, INDIANA, ASSIGNOR TO OUTING KUMFY-KAB COMPANY, OF LAPORTE, INDIANA, A CORPORATION OF INDIANA.

WHEEL MOUNTING FOR VEHICLES.

Application filed December 12, 1921. Serial No. 521,621.

*To all whom it may concern:*

Be it known that I, REINHARDT H. BROWN, a citizen of the United States, and a resident of Laporte, in the county of Laporte and State of Indiana, have invented certain new and useful Improvements in Wheel Mountings for Vehicles, of which the following is a specification.

My invention is concerned with a wheel mounting for vehicles, and more especially for the rear wheels of velocipedes, and it is designed to produce a simple and cheaply constructed mounting whereby the wheels can be quickly mounted upon their axles, when assembled, and in which they can be as quickly and easily removed, when desired.

To illustrate my invention, I annex hereto a sheet of drawings, in which the same reference characters are used to designate identical parts in all the figures, of which,—

Fig. 1 is a perspective view of a velocipede employing my invention in the mounting of the rear wheels thereof;

Fig. 2 is an enlarged view, showing the mounting as seen substantially in side elevation;

Fig. 3 is a section on the line 3—3 of Fig. 2; and

Fig. 4 is a view in section on the line 4—4 of Fig. 2.

In carrying out my invention as applied to the velocipede shown in Fig. 1, I preferably make the rear fork of the frame of strap metal 10, which preferably has the shape in cross section shown in Fig. 3, and the lower end of each of the fork members has the portion 11, which extends at right angles to a horizontal line, and is provided with a circular aperture 12, through which passes the axle 13, which is preferably made of a round rod and having any suitable means for preventing it from moving longitudinally in the apertures 12, such for instance as the cotter pins 14 passing through holes 15 in the rod adjacent the inside of the fork. The hub 16 is of any desired construction, except that it must be provided at one end, preferably the inner end, with an annular channel 17, which is preferably formed by securing the disk 18, having the reduced peripheral portion 19, upon the hub and resting up against the ring 20, to which the spokes 21 are secured. It will be noted that this annular channel 17 has its sides formed by the adjacent sides of the disk 18 and the ring 20, and its bottom by the portion 19. The latch member 22 is preferably pivotally mounted on the portion 11, as by a rivet 23, and has its lower end 24 generally circular in its outline except that the U-shaped recess 25 is cut from the side thereof, so that the catch can be swung into the position shown in Fig. 2, with the recess 25 entering the channel 17. As a convenient means of securing the latch in a desired retaining position, I employ a clip or flattened ring 26, which can be shoved up to the dotted-line position shown in Fig. 2 when desired, and the latch 22 then swung to the dotted-line position to release the hub so that the wheel can be removed. The said lower end 24 preferably has its outer edge turned over a little, as indicated at 27 to stiffen it.

While I have described and shown my invention as embodied in the form which I at present consider best adapted to carry out its purposes, it is capable of some slight modifications, and I do not desire to be limited in the interpretation of the following claims except as may be necessitated by the state of the prior art.

What I claim as new, and desire to secure by Letters Patent of the United States, is:

1. In a wheel mounting for vehicles, the combination with an axle, of an upwardly extending bar supporting the axle and from which it projects, a hub having an annular channel in one end thereof, and a latch carried by the bar and movable relative thereto to bring the latch into the annular channel.

2. In a wheel mounting for vehicles, the combination with an axle, of an upwardly extending bar supporting the axle and from which it projects, a hub having an annular channel in one end thereof, a latch carried by the bar and movable relative thereto to bring the latch into the annular channel, and means to secure the latch rigidly when in said channel.

3. In a wheel mounting for vehicles, the combination with an axle, of an upwardly extending bar supporting the axle and from which it projects, a hub having an annular channel in one end thereof, a latch carried by the bar and movable relative thereto to bring the latch into the annular channel, and a clip sliding on the bar and adapted to be moved down into position to embrace the latch.

4. In a wheel mounting for vehicles, the combination with an axle member, a pair of upwardly extending bars forming a fork in the bottom of which are apertures through which the axle member extends, hubs having an annular channel in the adjacent ends thereof, and latches pivoted on the bars above the axle member and adapted to enter the annular channels, substantially as and for the purpose described.

5. In a wheel mounting for vehicles, the combination with an axle member, a pair of upwardly extending bars forming a fork in the bottom of which are apertures through which the axle member extends, hubs having an annular channel in the adjacent ends thereof, latches pivoted on the bars above the axle member and adapted to enter the annular channels, and clips sliding on the bars and adapted to be moved down into position to embrace the latches, for the purpose described.

In witness whereof, I have hereunto set my hand this 5th day of December, 1921.

REINHARDT H. BROWN.

In the presence of witness:
JOHN HOWARD McELROY.